US009208499B2

(12) United States Patent
Vande Velde

(10) Patent No.: US 9,208,499 B2
(45) Date of Patent: Dec. 8, 2015

(54) DYNAMICALLY MAPPING IMAGES ON OBJECTS IN A NAVIGATION SYSTEM

(75) Inventor: Linde Vande Velde, Merelbeke (BE)

(73) Assignee: TomTom Belgium N.V., Ghent (BE)

( * ) Notice: Subject to any disclaimer, the term of this patent is extended or adjusted under 35 U.S.C. 154(b) by 199 days.

(21) Appl. No.: 12/736,877

(22) PCT Filed: Dec. 19, 2008

(86) PCT No.: PCT/EP2008/068091
§ 371 (c)(1),
(2), (4) Date: Jan. 10, 2011

(87) PCT Pub. No.: WO2010/069406
PCT Pub. Date: Jun. 24, 2010

(65) Prior Publication Data
US 2011/0106595 A1    May 5, 2011

(51) Int. Cl.
*G06Q 30/00* (2012.01)
*G06Q 30/02* (2012.01)
*G06F 17/30* (2006.01)
*G01C 21/36* (2006.01)

(52) U.S. Cl.
CPC ............ *G06Q 30/02* (2013.01); *G01C 21/3638* (2013.01); *G06F 17/30056* (2013.01); *G06F 17/30265* (2013.01); *G06Q 30/0215* (2013.01); *G06Q 30/0241* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 6,285,317 B1 | 9/2001 | Ong | |
| 6,360,167 B1* | 3/2002 | Millington et al. | 701/516 |
| 6,714,860 B1* | 3/2004 | Wawra et al. | 701/408 |
| 7,089,264 B1 | 8/2006 | Guido et al. | |
| 7,451,041 B2 | 11/2008 | Laumeyer et al. | |
| 7,689,355 B2* | 3/2010 | Abernethy et al. | 701/438 |
| 2004/0128070 A1 | 7/2004 | Schmidt et al. | |
| 2005/0256766 A1* | 11/2005 | Garcia et al. | 705/14 |
| 2006/0170693 A1* | 8/2006 | Bethune et al. | 345/568 |
| 2006/0253481 A1 | 11/2006 | Guido et al. | |
| 2007/0124157 A1* | 5/2007 | Laumeyer et al. | 705/1 |
| 2009/0037273 A1* | 2/2009 | Zhu | 705/14 |

FOREIGN PATENT DOCUMENTS

| | | |
|---|---|---|
| DE | 19957550 A1 | 6/2001 |
| EP | 1271458 A2 | 1/2003 |
| WO | WO-2008/044914 A1 | 4/2008 |

OTHER PUBLICATIONS

Cornelis et al, Fast Compact City Modeling for Navigation Pre-Visualization, Computer Society Conference. Jun. 2006.

* cited by examiner

*Primary Examiner* — John G Weiss
*Assistant Examiner* — Christopher Stroud

(57) ABSTRACT

A method of and system for displaying information on a display are disclosed. In at least one embodiment, the method has the following actions: a) accessing a 3D model with 3D objects 5 b) showing on the display a graphical display of one or more scenes comprising a moving view on one or more of the 3D objects as seen from a certain moving point of view, the one or more 3D objects comprising at least one advertisement space, the at least one advertisement space having an advertisement space location and an advertisement space size, c) receiving a message inclusive of message data and message location data, and d) in dependence on a distance between the moving point of view and the one or more 3D objects, mapping the message data on the at least one advertisement space if the advertisement space location is associated with the message location data such that the message data overlays the advertisement space in the display.

18 Claims, 4 Drawing Sheets

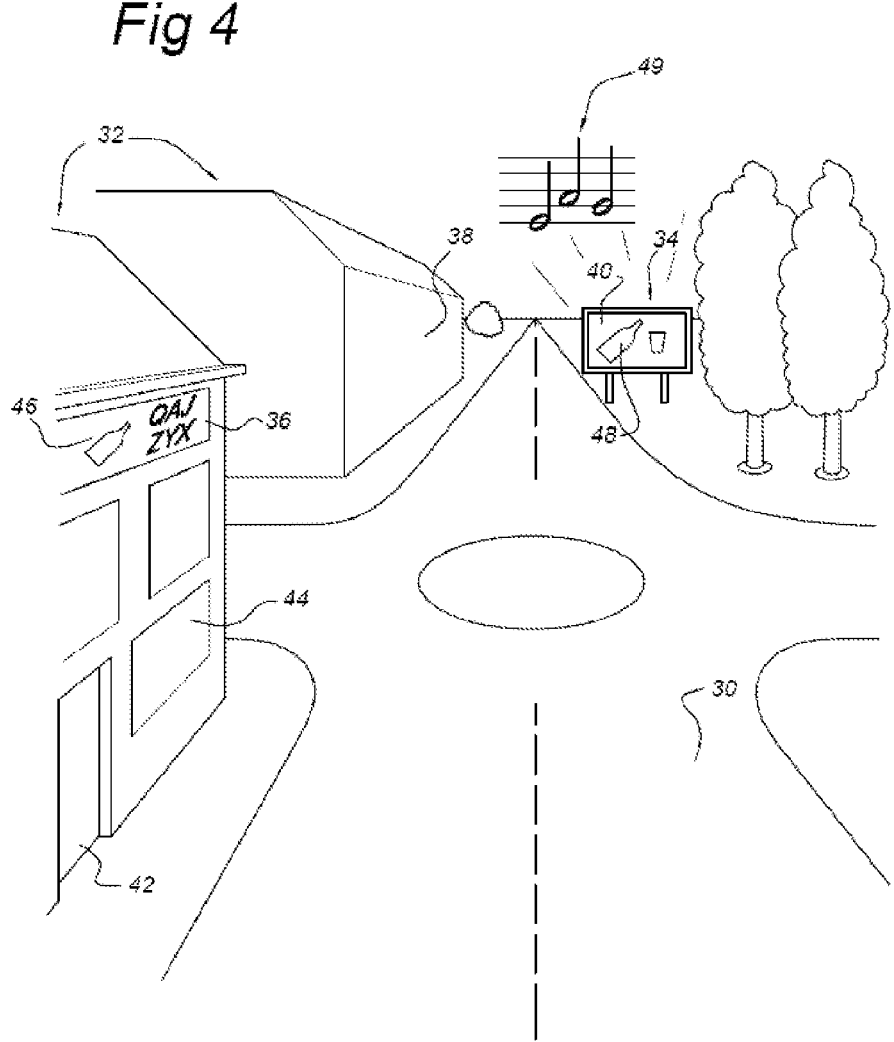

DYNAMICALLY MAPPING IMAGES ON OBJECTS IN A NAVIGATION SYSTEM

FIELD OF THE INVENTION

The present invention relates to dynamically mapping messages on 3D objects in a 3D world representation as shown on a display. The invention both relates to a method and an apparatus to do so, as well as to a computer program product and a data carrier comprising such a computer program. The messages may be or relate to advertisements. In the context of the present invention, a "message" should be interpreted broadly. I.e., the term "message" is understood to include at least one 2D or 3D image, and possibly an audio message as well. The image may include a single picture taken from the reality, an animated picture, a symbol like a trademark, text, etc. Moreover, the image may be a series of moving pictures like a video, e.g. showing a moving 2D or 3D object either taken from reality or animated.

BACKGROUND OF THE INVENTION

It is known to show advertisements on a display in a navigation system on board a vehicle when the vehicle is driving down a road.

For instance, U.S. Pat. No. 7,089,264 discloses a "virtual billboard" showing an advertisement to an user of a navigation device if he passes a predetermined "virtual billboard" location along a road. The specification is not very specific as to what is "shown" to the user. FIG. 9 seems to suggest that the advertisement is an audio message to the user.

U.S. Pat. No. 6,285,317 discloses a navigation system with a three-dimensional display of a scene on a display of a navigation system on board a vehicle. The three-dimensional display shows an image of an area as also visible through the windscreen of the vehicle driven by a driver. The navigation system is programmed to calculate a route to be driven by the driver from a starting location to a destination location. The navigation system generates an image of an arrow having a direction in accordance with a next manoeuvre necessary to be performed by the driver in accordance with the calculated route. The navigation system is also programmed to process the image and the arrow such that the arrow is overlaid over the image on the display such that it indicates the road segment in the image to be taken by the driver. In an embodiment, U.S. Pat. No. 6,285,317 discloses to wirelessly supply road information on-line from a service provider to the navigation system such that data can be shown on the display that is updated real-time. By doing so, for instance, a restaurant visible on the display can be highlighted to attract attention from the driver and other passengers of the vehicle. Virtual bill boards or blimps flying in the sky with advertisements and the like can be shown in the generated scene on the display.

PCT/NL2006/050265 discloses a mobile mapping system that can be used to collect pictures of real world buildings as well as laser scan samples relating to those buildings. The pictures and samples are stored in a memory. A sub-set of the laser scan samples relates to façades of buildings. Moreover, the memory stores location data as to each laser scan sample and the picture. The picture includes data as to a wall of the façade and data as to texture elements in the wall. A processor automatically identifies the wall in the picture and the texture elements in the picture while using the laser scan samples. Some texture elements, like wall portions, doors and windows, may be automatically removed from the pictures after being identified in this way and be replaced by a reference to a reference texture element. This document does not disclose ways to dynamically update images on predetermined portions of objects in a scene shown on a display in a navigation system.

U.S. Pat. No. 7,451,041 discloses a network-based navigation system. The system has a user interface and a computer server that can access a map database, an actual imagery database and an advertisement database. The map database comprises geographic map data. The actual imagery database comprises a plurality of images of roadways taken by a camera from a driver's perspective. Such a camera may be mounted on a special data acquisition vehicle used to drive along the routes before the images are used in the navigation system. Together, the images correspond to a 360 degree field of view. The advertisement database comprises advertisement data. The user can request the system to provide visual route guidance information for display on a display. The system may guide the user to a destination along the route by continually recreating a view along a virtual road as the vehicle virtually travels down the road. Traveling along the virtual road as shown on the display is generated by showing to the user via the display a sequence of the images as taken by the camera earlier in time, thus creating a virtual "drive-thru". The system also replaces a polygon region in the actual imagery with an advertisement from the advertisement database and, in this way, shows the advertisement to the user of the navigation system as if it is present on the polygon region in the actual imagery.

A disadvantage of the system according to U.S. Pat. No. 7,451,041 is that the sequence of images on which the drive-thru is based comprises images taken after one another at a certain time delay. When shown to a user in series they may suggest to simulate a video of traveling along the roads but actually they only show a jerky sequence of still images. Moreover, the images are taken from well defined points on the road thus providing only a 2D basis for the simulated 3D view on the display.

The field addressed by the present invention relates to showing messages like advertisements on 3D objects in a 3D environment as shown on a display of a navigation system, which navigation system may be a "virtual" navigation system. Virtual navigation systems may be defined as systems with which a user can virtually move, for instance with an animated vehicle, through a 3D world as, for instance, supported by suitable software on a computer system or by a suitably programmed website. Below, when the term "navigation system" is used reference is made to both physical and virtual navigation systems.

SUMMARY OF THE INVENTION

It is an object of the invention to provide an improvement of a navigation system having a display showing three-dimensional scenes to a user having messages like an advertisement overlaid over or superimposed to 3D objects in the scene which messages can be dynamically updated.

To that effect the invention relates to a system as claimed in claim 1.

By applying the invention, messages, for instance relating to advertisements, are displayed by the system on surfaces of 3D objects that are present in the real world too. Such object surfaces may be portions of building facades or advertisement panels like billboards. When the system is a physical navigation system this avoids confusion with the user when navigating in a 3D world, since no objects are shown on his display that differ from the real world surrounding him. In contrast to the prior art, these objects are 3D objects stored as such in a database. These 3D objects are stored as parts of a 3D model which defines the physical structures of the objects as well as the exact locations of its constituting parts on the earth's surface. This is a vector based data model although some imagery may be used too. This provides the system with the possibility to show a real video-like view on these objects and their advertisements as seen from different viewer's positions instead of a jerky concatenation of images when the viewer moves through reality. Furthermore, the present invention will appear natural in a virtual pass through the data even at altitudes above the normal elevation of a vehicle. This is because the prior art of using images will not look complete as the view position can see the edges of the image space. In contrast, the 3D object model can be realistically viewed from all angles. And finally, the present invention is better integrated into a real navigation system in an embodiment where the location of roads is shown along with attributes such as street names, turn restrictions and the like.

In an embodiment, the invention relates to a method of displaying messages on a display in a system as claimed in a further independent claim. Other independent claims relate to a computer program product allowing such a method to be performed on a system and a data carrier having such a computer program product, as well as a communication system comprising such a system and a server that allows downloading such messages to the system on the fly.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

The drawings show:

FIG. 4 shows the example of FIG. 3, however, having a message overlaid on an advertisement space on a surface of an object in the picture.

DETAILED DESCRIPTION OF EMBODIMENTS

The present invention is applicable in all kinds of navigation systems: handheld devices, PDAs, and mobile telephones with navigation software and in-car navigation systems built in a vehicle. The invention can be implemented in any type of standard navigation system nowadays available on the market. In order to better understand the present invention, below, the application in one possible in-car navigation system will be further explained in detail. However, this does not exclude any other type of implementation, for instance, a handheld device or navigation system in an aircraft. Moreover, the invention is also applicable in virtual navigation systems where one virtually moves through an animation of reality, as indicated in the introduction of the present specification.

Figure 1:
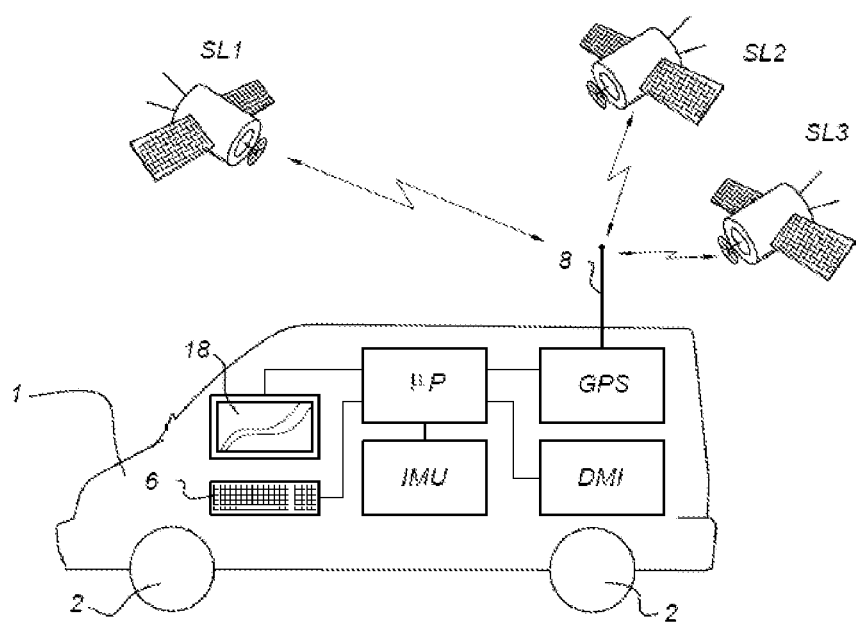
FIG. 1 shows a vehicle with a navigation system.
Figure 2:
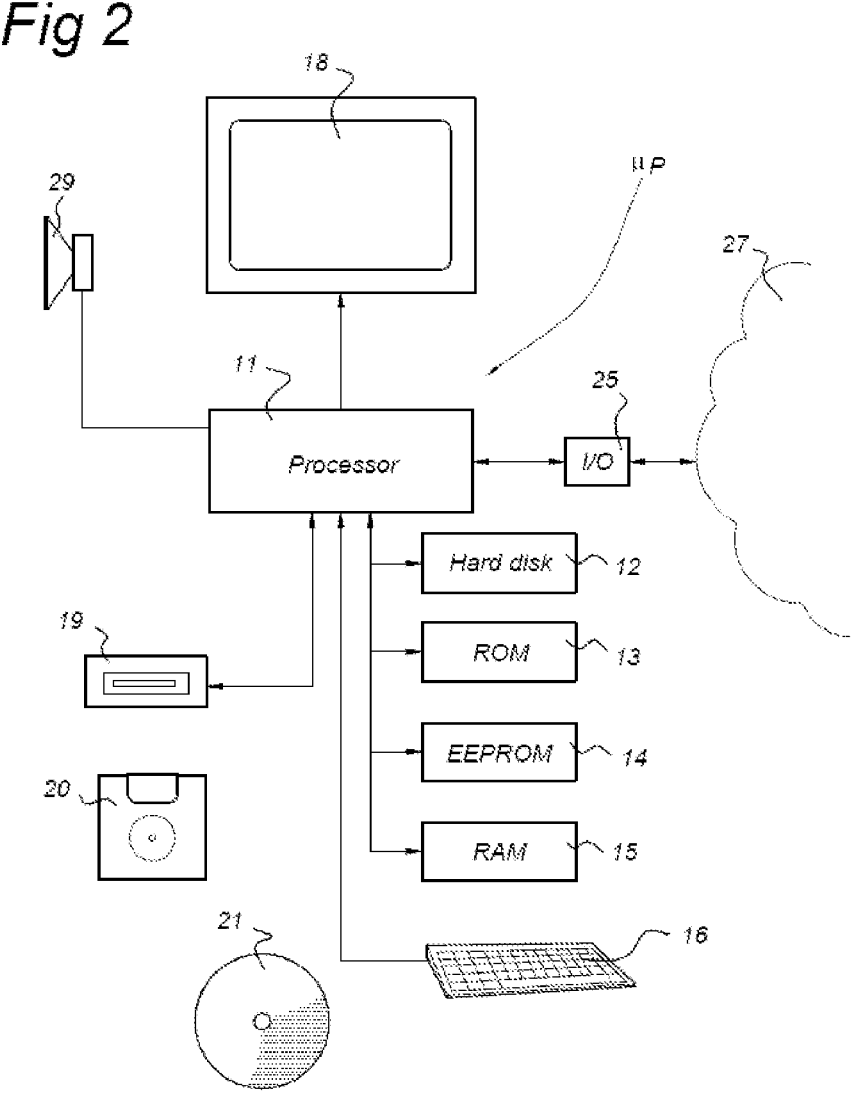
FIG. 2 shows a computer arrangement that can be used as the microprocessor of the navigation system of FIG. 1.

FIG. 1 shows a vehicle provided with a navigation system. The vehicle 1 is provided with a plurality of wheels 2. Moreover, the vehicle 1 is provided with a navigation system. As shown in FIG. 1, the navigation system may comprise the following components:

a position determination device which may include a GPS (global positioning system) or other GNSS (Global Navigation Satellite System) unit connected to an antenna 8 and arranged to communicate with a plurality of satellites SLi (i=1, 2, 3, . . . ) and to calculate a position signal from signals received from the satellites SLi. The GPS system may also deliver heading data (i.e., direction of travel) and speed of the vehicle 1. The GPS system may be a DGPS system (differential GPS) or one augmented by WAAS (Wide Area Augmentation System) providing an accuracy of 1 sigma/1 meter (apart from possible white noise). The GPS system is connected to a microprocessor μP that is arranged to process the GPS output signals.

a microprocessor μP connected to the GPS unit. Based on the signals received from the GPS system, the microprocessor μP determines suitable display signals to be displayed on a display 18 in the vehicle 1, informing the driver where the vehicle is located and possibly in what direction it is travelling. The display 18 may be a so-called head-up display HUD. Moreover, in the context of the present invention, the microprocessor μP may be programmed with route planning software to calculate a route for the driver of the vehicle from a starting location to a destination location. Such a destination location is, for instance, input by a driver via a keyboard 6 which is connected to the microprocessor μP. The keyboard 6 can also be used by the driver to ask the microprocessor μP to show other information as is known to persons skilled in the art. Instead of a keyboard 6 any alternative device used by the driver to communicate with the microprocessor μP can be used, like a touch screen or a voice convertor. The microprocessor generates suitable routing instructions for the driver that include both visual data shown on the display 18 and audible data via a speaker 29 (FIG. 2). Such route planning software is known from the prior art and does not need further clarification here. Below, only the features of such software necessary for the invention are clarified in detail. The microprocessor μP is also arranged to communicate in a wireless way with remote computer arrangements, for instance, as operated by a service provider. The microprocessor can download messages from such a remote computer arrangement and dynamically refresh messages as shown on display 18, as will be further explained below.

As shown, in order to enhance the precision of the position determination, the position determination system may comprise a DMI (Distance Measurement Instrument). This instrument is, for instance, an odometer that measures a distance traveled by the vehicle 1 by sensing the number of rotations of one or more of the wheels 2. The DMI may operate with a sampling frequency of 10 or more Hz. The DMI is also connected to the microprocessor μP to allow the microprocessor μP to take the distance as measured by the DMI into account while processing the output signals from the GPS unit. DMIs are not yet widely applied in in-car navigation systems but they may well be in the (near) future.

In a further embodiment, and to further enhance the precision of the position determination, the position determination system may comprise an IMU (Inertial Measurement Unit). Such an IMU can be implemented as three gyro units arranged to measure rotational accelerations and three accelerometers arranged to measure translational accelerations along three orthogonal directions. The IMU/gyros and accelerometers may operate with a sampling frequency of 200 Hz. The IMU is also connected to the microprocessor μP to allow the microprocessor μP to take the measurements by the IMU into account while processing the output signals from the GPS unit. Like DMIs, IMUs are not yet widely applied in in-car navigation systems but they may well be in the (near) future.

It will be understood by one skilled in the art that there are other navigational sensors that may be added or substituted to the arrangement described above.

The system may, in an embodiment, also include components for receiving broadcasted messages (RDS TMC, TPEG, . . . ) or point to point connections such as GPRS. Also a trusted element, like a SIM-card with a unique ID, could be integrated allowing the navigation system to be recognised uniquely in communications with third party devices.

The navigation system may have an integrated mobile telephone functionality allowing the user to have a hands free telephone call with a third party. Additionally or alternatively, the system may comprise a communication device arranged to communicate with a mobile telephone of a user via a wired or wireless connection, e.g., via a Bluetooth or infrared connection such as to allow the user of the mobile telephone to use a microphone and loudspeakers of the system during a hands free telephone call.

In FIG. 2, an overview is given of microprocessor µP that can be used in accordance with the invention. The microprocessor µP comprises a processor 11 for carrying out arithmetic operations.

The processor 11 is connected to a plurality of memory components, including a hard disk 12, Read Only Memory (ROM) 13, Electrically Erasable Programmable Read Only Memory (EEPROM) 14, and Random Access Memory (RAM) 15. Not all of these memory types need necessarily be provided.

The processor 11 is also connected to means for inputting instructions, data etc. by a user, like a keyboard 16, a touch screen and/or a voice converter.

A reading unit 19 connected to the processor 11 is provided. The reading unit 19 is arranged to read data from and possibly write data on a physical data carrier like a floppy disk 20 or a CDROM 21. Other data carriers may be tapes, DVD, CD-R. DVD-R, memory sticks etc. as is known to persons skilled in the art.

The processor 11 is connected to display 18, for instance, a monitor or LCD (Liquid Crystal Display) screen, or any other type of display known to persons skilled in the art. The processor 11 is also connected to speaker 29.

The processor 11 is connected to a communication network 27 via a wireless connection, for instance, the Public Switched Telephone Network (PSTN), a Local Area Network (LAN), a Wide Area Network (WAN), the Internet etc. by means of I/O means 25. The processor 11 is arranged to communicate with other communication arrangements through the network 27.

The physical data carrier 20, 21 may comprise a computer program product in the form of data and instructions arranged to provide the processor with the capacity to perform a method in accordance with the invention. However, such computer program product may, alternatively, be downloaded via the telecommunication network 27.

The processor 11 may be implemented as stand alone system, or as a plurality of parallel operating processors each arranged to carry out subtasks of a larger computer program, or as one or more main processors with several sub-processors.

Figure 3:
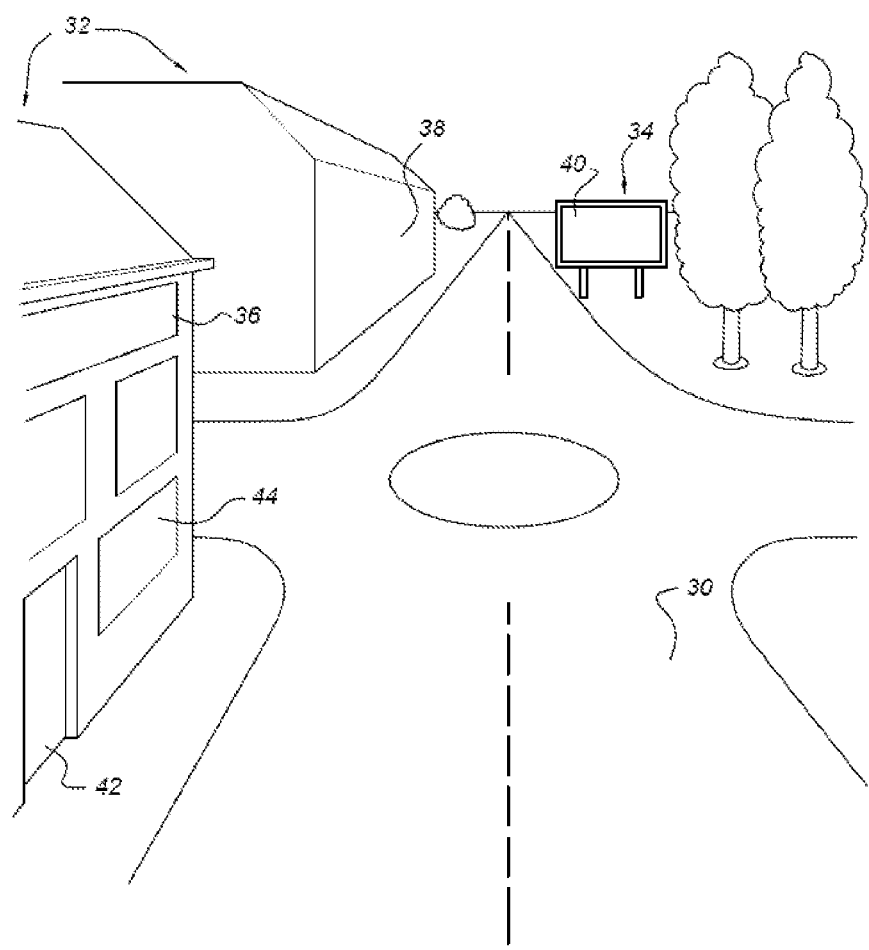
FIG. 3 shows an example of a picture on a display of the navigation system.

The microprocessor µP in the navigation system is programmed to show a graphical display of the scene on the display 18 which scene is associated with the scene as visible to the driver of the vehicle through the windscreen of his vehicle. As the position of the navigation changes and thus the point of view the graphical display of the scene changes too. FIG. 3 schematically shows an example of such a scene. The scene as shown comprises one or more road segments 30 of a road network, one or more buildings 32 and a billboard 34. The buildings 32 may have one or more doors 42 and one or more windows 44. The buildings have surfaces 36, 38 not occupied by doors 42 or windows 44 and that are suitable to display overlaid images, like advertisements. The billboard 34 has a surface 40 suitable to display such overlaid images. Of course, spaces on surfaces of objects like buildings and billboards that are suitable to display messages are not restricted to surfaces that, in reality, do not have texture elements like doors and windows. However, as will be explained hereinafter portions without such texture elements can be automatically detected which enhances production speed when marking such spaces in pictures.

The picture (possibly including text) or animated image is stored in a memory which may be a memory of the microprocessor µP within the vehicle itself or a memory of the remote computer arrangement of the service provider. In the latter case, the microprocessor µP is programmed to download such pictures or animated images on the fly from the server of the service provider.

In an embodiment, downloading may be allowed only from such a server within the context of a subscription. Then, to make this work the server should have stored an ID of the navigation system of the user who has subscribed to the service. This can be implemented in any way known to persons skilled in the art. For instance, the navigation system may have a SIM card provided with a SIM card ID that is sent to the server any time the navigation system connects to the server to download one or more messages.

Such a subscription may be personalized. The user of the navigation system may be requested by the server when subscribing to the service to complete a questionnaire. Based on answers given on the questionnaire each subscriber may be classified in a certain predetermined subscriber profile. Each subscriber profile may be assigned a different service profile. Criteria may e.g. be the income range, personal interests like cars, sports, culture, types of holidays, etc. Based on this, the navigation system may be sent different messages. For instance, a BMW driver may receive other messages than a Suzuki driver.

Such a subscription may either be a payment or free subscription.

Alternatively, no subscription is necessary at all to receive advertisements. For instance, navigation systems may be offered for free provided the "buyer" accepts receiving advertisements as determined by a provider.

In order for the present invention to work, one or more surfaces of the 3D objects should be marked as being a location where a message, like an advertisement, can be overlaid. To that effect the following method can be used.

Preparation of a 3D model with 3D objects is performed by an off-line computer arrangement that may be set up in a similar way as the computer arrangement shown in FIG. 2. Such a 3D model is a vector based data model. However, this vector based model may be extended by some imagery, for instance, in the 3D object texture. Such a computer arrangement stores a suitable software program to produce and store such a 3D model. To that end, such a software program may instruct the processor of the computer arrangement to perform the following actions:

Receiving pictures or animated images of real world objects and store them in memory. Such pictures may be made with a mobile mapping system as, for instance, explained in PCT/NL2006/050265. Alternatively, or additionally, such pictures may be made with an airborne vehicle or a satellite. Such pictures or animated images may be made with a camera or laser scanner and can be used to produce data in the form of a 3D model that can be used to show a graphical display of one or more scenes comprising a moving view on such real world objects as seen from a certain moving point of view. How such a 3D model with 3D objects can be made based on such pictures or animated images is prior art and need no further explanation here.

Either automatically identifying or allowing an operator to identify surfaces on such 3D objects where a message, like an advertisement, can be overlaid and marking such surfaces with a mark in memory. Such a surface will be called an "advertisement space".

In the first case, a method as disclosed in PCT/NL2006/050265 can be used. The computer arrangement is then programmed to identify texture elements of the 3D objects that relate to a wall or wall portion where such other message can be suitably overlaid and can thus serve as advertisement space. Such wall or wall portion may suitably be surface 36, 38 of a building façade only comprising bricks or at least not comprising any doors and/or windows. Alternatively, the computer arrangement is programmed to identify a suitable advertisement space including a wall portion and one or more texture elements that fulfill a specific requirement, like windows on the upper floor only. However, such a texture element may also be the surface 40 of the billboard 34.

In the second case, the computer arrangement presents the 3D objects, like buildings 32 and billboard 34, to the operator on a display and provides the operator with the option to mark surfaces 36, 38, 40 on such objects where another message, like an advertisement, can be overlaid. This can, for instance, be done by allowing the operator to mark the surface 36, 38, 40 as being such an "advertisement space" by using a cursor on the display with a mouse, and then storing a mark to this surface 36, 38, 40 obtained in this way in memory. In this way, particular advertisement features can be created during the creation of, for instance, 3D models. While using mobile mapping data as input for the production of such 3D models, operators can easily detect suitable places for advertisements like billboards, advertisement windows, poles etc.

Now some more details are provided as to how storage of such marks against the surfaces 36, 38, 40 may be implemented in memory of the server of the service provider. Below, such surfaces 36, 38, 40 will be referred to as "advertisement space". Such advertisement spaces need not necessarily be two-dimensional. Alternatively, such advertisement space may have a 3D shape like a building or a 3D billboard.

Each advertisement space has a dimension and shape and is stored against a "basic advertisement value", for instance, based on other surrounding and other related map features, like importance of the road where the area is located in reality (e.g. located in a rural or city area), size of the advertisement space, etc. So, each advertisement space can be sold as point, line, horizontal 2D area, vertical 2D area, 3D area on a "reality" advertisement space.

One application is the dynamic advertisement linked to advertisement spaces on POI's (point of interest) since messages could be directly linked to the location, type and activity of the POI.

Attributes of the advertisement space as stored in memory of the server of the service provider may be:

Location coordinates of the advertisement space. For a flat advertisement space, these could be four coordinates in a 3D-space corresponding to the location on earth where the advertisement space is located. These four coordinates could be: upper left, upper right, lower left, and lower right. In case the advertisement space is not flat—then the outer coordinates of this non-flat space should be given.

The time period this advertisement space is available. By specifying the time in this way and the coordinates of the location of the advertisement spaces they can be dynamically replaced in a 3D city model over an existing space in a 3D city model.

The time period the content of a certain message is available. The longer the time period the more expensive it may be for the advertiser of the message.

The time itself a message is shown. For instance, showing a certain message at a certain date and time may be more expensive for the advertiser than other dates and times. For instance, showing a certain beer brand may be more expensive when shown closer in time to an important football match.

Size of the advertisement space. This can be calculated automatically from the stored coordinates, as will be evident to a person skilled in the art. The size can be stored in $m^2$ or any other suitable unit.

a "value attribute" which depends on the importance of the location of the space in the real world. For instance, a space on a house in a small street will be much cheaper than a space on a house in a big street with much traffic. The following parameters may influence the importance of an advertisement space:

the actual size of the advertisement space the location of the advertisement space in general terms, e.g., the distance to the road as traveled by the user of the navigation system or the distance to a location where a sporting event can be held the location of the advertisement space on a building the functional road class in which the advertisement space is located predicted traffic density for a location time and time duration of renting complexity and quality of display, like a 2D or 3D image.

It is not important how the 3D model is finally rendered in the end-user application, i.e. in the navigation system used by the end-user.

In one embodiment, the navigation system itself stores data as to the 3D objects based on the 3D model in its memory 12, 13, 14, 15, such as the one shown in FIG. 3. 3D objects like buildings may have walls provided with texture elements like windows and doors. To that effect, the walls may be provided with texture elements selected from sets of reference texture elements. By using references to such reference texture elements memory space can be saved, as is explained in more detail in PCT/NL2006/050265. Data as to the 3D model may be updated on-the-fly by the navigation system by downloading updated data from the 3D model from the server of the service provider. This updated data will include updated data as to surfaces on the objects where new advertisement spaces have become available, e.g., new billboards along the road traveled by the user.

In use, the navigation system will receive content of a message, e.g. an advertisement, to be overlaid over an advertisement space in the picture or animated image shown on display 18, as well as the coordinates indicating where the message should be located from the server of the service provider.

Preferably such coordinates are geocoded coordinates. However, to be more flexible and to be able to cope with cases where advertisers have no geocoded information for the geocoded related advertisement available, both the server of the service provider and the navigation system may be provided with so-called map independent location referencing technology software. One example of such software is used in Agora-C coders and decoders which are arranged to automatically provide an Agora-C Code to a geospatial related advertisement, in order to allow the navigation system to position the advertisement on the correct spot on display 18. Details as to such Agora-C coders and decoders can be found in ISO Standard 17572-3. Such systems can be extended to define the coordinates of 3D objects if needed to be extended.

In an embodiment, processor 11, as instructed by the software program stored in memory 12, 13, 14, 15, maps the coordinates of the received message to the coordinates of the advertisement space as shown on display 18 and, thus, shows the message on top of the area of the texture of the 3D model where the advertisement space was originally calculated from.

Even if there is no 3D model available in the navigation system, the processor 11 is still able to visualize the message in the advertisement space as an icon or as an image with the original dimension.

FIG. 4 shows an example of how an advertisement 46 can be shown to a user on display 18. The advertisement is overlaid on advertisement space 36 on building 32.

Similarly, an advertisement 48 can be shown in advertisement space 40 on billboard 34. In addition to the advertisement, an audio message can be played by the navigation system as schematically indicated with reference 49 in FIG. 4. The audio message may, for instance, be a well known tune of a brand name relating to the advertisement shown on billboard 34.

When the user, for instance the driver of a vehicle accommodating the navigation system, approaches the advertisement space, the navigation system will change the dimensions and viewing angle of the scene such as to correspond with the current position. Thus when approaching billboard 34, the system will show billboard 34 and the advertisement 48 on an increasing format. Since the 3D object on which the advertisement space is located is stored as part of a 3D model the processor of the navigation system can easily calculate the way the 3D object should be displayed on the display of the navigation system in dependence on the position of the navigation system relative to the corresponding 3D object as present in reality.

Moreover, in dependence on the distance between the user and the real world billboard 34 in reality, the navigation system may perform at least one of the following actions:

improving the level of detail, i.e. the resolution, of the advertisement shown on billboard 34 when the user comes closer to the real world billboard 34 dynamically amending the content of the advertisement when approaching the real world billboard, for instance, showing only a bottle at a first distance of say 100 m, then the bottle with a name of the product like "beer" at a second distance of say 50 m, and finally the bottle with the name of the product and a name of the producer like "Heineken" at a third distance of say 25 m. The advertisement information necessary to do so may be received on-line by the navigation system from the server of the service provider and may be requested by the navigation system from the server in dependence on the distance to the real world billboard 34. Alternatively, the navigation system may have received all such information within one message, for instance received from the server when being at a certain distance of say 200 m from the real world billboard.

instead of the message itself related to the advertisement space popping up on the display 18 within a certain distance from the real world object, only an icon may be shown in the advertisement space on the display that can be operated as a link by the user of the navigation system. By operating the link, the navigation system will then show the message itself.

virtually rotating the billboard 34 on display 18 such as to show billboard 34 from a point of view perpendicular to the surface of billboard 34.

In an embodiment, the display 18 is a touch screen allowing the user to touch the advertisement space with, for instance a finger or a pen or the like. When doing so, the touch screen will send a signal to that effect to the processor 11 which is arranged to interpret this signal as if the user operated a hyperlink to a website of the advertiser. The processor 11 then establishes a link to this website and shows the content of the website on display 18 to the user. The website image may comprise further buttons that can be operated by touching the display 18 in order to allow the user to find some specific information. Instead of using a touch screen the navigation system may be provided with an other input device, like a mouse pad operable by a users finger, allowing the user to navigate a cursor across the website and search information from other webpages of the advertiser by selecting certain buttons on the display 18.

In an embodiment, one such button relates to a telephone number of the advertiser. When operating that telephone number the navigation system calls the advertiser and establishes a telephone link between the advertiser and a mobile phone of the user. Such a mobile phone may be a built-in telephone in the navigation system in the vehicle allowing the user to have a hands free conversation with the advertiser. However, the navigation system may alternatively be arranged to use its I/O device 25 to make a wireless connection to a separate mobile of the user, e.g. via a bluetooth connection.

Instead of, or in addition to, distance to the real world object being a parameter influencing the content of the message shown on display 18, the speed of the vehicle accommodating the navigation system may influence the content of the message shown on the display 18. The speed of the vehicle can be calculated, as is evident to a person skilled in the art, by the navigation system from satellite signals received by the GPS (or GNSS) unit or by signals from the DMI if present. Alternatively, a speed signal received from a speed measurement device as present in any vehicle can be used by the microprocessor μP. Options for such speed dependent showing of messages are as follows:

For instance, a certain message may only be shown when the vehicle is driving below a certain threshold speed. This may be advantageously used when showing a message on locations where the traffic situation is complex and any additional information shown to the driver may distract him/her from driving. Such a complex location may be a complex junction.

In a further embodiment, the information content shown on display 18 may be coupled to the speed of the vehicle. For instance, the microprocessor μP may be programmed to show only a bottle when the vehicle is driving with a speed of more than 90 km/hour, the bottle with a name of the product like "beer" when the vehicle is driving with a speed between 50 and 90 km/hour, and finally the bottle with the name of the product and a name of the producer like "Heineken" when the vehicle is driving with a speed below 50 km/hour. Again, the advertisement information necessary to do so may be received on-line by the navigation system from the server of the service provider and may be requested by the navigation system from the server in dependence on the speed of the vehicle. Alternatively, the navigation system may have received all such information within one message, for instance received from the server when being at a certain distance of say 200 m from the real world billboard.

Instead of the message itself related to the advertisement space popping up on the display 18 within a certain distance from the real world object, only an icon may be shown that can be operated as a link by the user of the navigation system. By operating the link, the navigation system will then show the message itself. The microprocessor μP may be programmed to allow operating such a link only when the vehicle is at standstill.

In an other embodiment, the advertisement relates to an announcement that one can buy or acquire something at special conditions, e.g. at a very low prize and the navigation system shows a button on the display with a text like "nearest place to buy". If one operates that button the processor 11 will respond by calculating a route from that location to the nearest sales point of the advertised good/service while using LBS related information to the advertisement as received from the server of the service provider. Alternatively or additionally, while displaying the advertisement the processor 11 is also arranged to display a further message like "for sale 2 miles down the road—at Mel's Sporting Goods Store" on a suitable place on the display 18.

Basically, there are two types of advertisements: non-geographically related (e.g. goods like mobile phones) or geographically related (e.g. a shop or a restaurant). Based on the type of advertisement concerned, an advertiser concerned can decide to advertise his advertisement as non-geographical advertisement, i.e. the advertisement will be displayed on advertisement places not directly related to the advertisement, or as geographical advertisement, i.e. the advertisement will be displayed on advertisement places directly related to the advertisement.

In case, when the advertiser wants to advertise non-geospatially related information such as goods (mobile phones, etc) the advertiser may even specify to advertise it on the position of one or all shops in a specific area where that specific good is offered. Also here Agora-C coders could be used to position the advertisement as an area or 3D object.

In general, the system as described above allows to dynamically upload, update, visualize and manage non-geographically related advertisements, as well as geographically related advertisements on fixed or mobile devices, both in GIS and navigation applications.

Above, it has been explained that the system can be used by service providers offering mobile navigation applications using server based stored content managed by the service operator. However, in an alternative embodiment, the service provider may offer internet map applications.

In an embodiment, the navigation system is programmed to allow the user to switch the advertisement feature on and off.

It is observed that by using a 3D model in the present invention the construction of the 3D display is different than in video based systems of the prior art. Because the 3D model can be manipulated in all 3 dimensions there is no video but rather a constant re-rendering of scenes at perhaps a new viewing point because the input indicated that the viewer has moved. This is flexible and allows the computer arrangement to really take into account where a driver of a vehicle with a navigation system has moved to or where an internet flyer in a virtual environment has navigated his viewing position. By using a vector based 3D model database graphical display can be shown fast. Moreover, they provide for great deal of flexibility. For instance, map attributes data of a navigation map database can be seamlessly added into the 3D scene which is not easy to do in a 2D image construction as known from the prior art.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A system comprising a processor and a display connected to the processor, said processor being connected to a memory storing a computer program comprising instructions and data in order to allow said processor to perform at least the following actions:
   a) accessing a 3D model with 3D objects
   b) showing on said display a graphical display of one or more scenes comprising a moving view on one or more of said 3D objects as seen from a certain moving point of view, said one or more 3D objects comprising at least one advertisement space, said at least one advertisement space having an advertisement space location and an advertisement space size,
   c) receiving a message inclusive of message data and message location data,
   d) in dependence on a distance between said moving point of view and said one or more 3D objects, mapping said message data on said at least one advertisement space if said advertisement space location is associated with said message location data such that said message data overlays said advertisement space in said display, and
   e) increasing displayed information content of said message mapped on said advertisement space, in inverse dependence on the distance between the point of view and the advertisement space location.

2. The system according to claim 1, wherein the system is a navigation system and comprises a position determination device for determining a position of said system in a road network, said point of view being said position of said navigation system, said computer program comprising instructions and data in order to allow said processor to perform the following action before action a):
   establishing a direction of travel of the navigation system based on data received from said position determination device,
   and said one or more scenes as shown on the display in action b) corresponding to a scene visible to a user of the navigation system in the direction of travel.

3. The system according to claim 1, wherein the memory stores route planning software arranged to allow the processor to calculate a route to be followed from a starting position to a destination.

4. The system according to claim 1, wherein said advertisement space location and said message location data have a geocoded location data format.

5. The system according to claim 2, wherein said computer program comprises instructions and data in order to allow said processor to download data as to said 3D model inclusive of location data of 3D objects visible in said graphical display, as well as said advertisement space location and said advertisement space size from a remote server.

6. The system according to claims 2, wherein said computer program comprises instructions and data in order to allow said processor to download data as to said 3D model inclusive of said message data and message location data in dependence on a location of said navigation system itself relative to said at least one advertisement space location.

7. The system according to claim 2, said processor being arranged to show at least one of contact information and a link to a website relating to said message on said display, the system comprising an input device allowing the user of the navigation system to select said link if shown and producing a selection signal to that effect, the computer program comprising instructions and data in order to allow said processor to show the website on said display upon receiving said selection signal.

8. The system according to claim 7, wherein said input device allows said user to navigate across said website and to operate one or more links shown on the website.

9. The system according to claim 1, wherein the processor is arranged to produce an audio message relating to the advertisement via a loudspeaker.

10. The system according to claim 8, wherein one such link relates to a telephone number of a telephone, and the computer program comprises instructions and data in order to allow said processor to establish a telephone link between the telephone and a predetermined mobile phone when the user operates said one link.

11. The system according to claim 1, wherein the computer program comprises instructions and data in order to allow said processor to perform at least one of the following actions in dependence on the distance between the point of view and the advertisement space location:
improving a resolution of the message as shown on the display,
dynamically amending content of the image when said distance becomes smaller or when zooming in,
virtually rotating the advertisement space on the display such as to show said advertisement space from a point of view substantially perpendicular to a surface of said advertisement space.

12. The system according to claim 1, wherein the computer program comprises instructions and data in order to allow said processor to show an icon on said display that is operable as a link by a user of the system before mapping said message data on said at least one advertisement space.

13. The system according to claim 1, wherein the computer program comprises instructions and data in order to allow said processor to show messages in dependence on speed of the system in at least one of the following ways:
showing a certain message only when the speed is below a certain threshold speed
showing an icon on said display that is operable as a link by a user of the system before mapping said message data on said at least one advertisement space and to allow operating such a link only when the system is at standstill.

14. A communication system comprising a system as claimed in claim 1, and a service provider server comprising a server processor and a server memory, the server memory storing said data as to said 3D model, said system and said service provider server being arranged to communicate with one another in a wireless fashion allowing said system to download said data as to said 3D model upon request.

15. The system according to claim 1, wherein the computer program comprises instructions and data in order to allow said processor to change the displayed information content of said message further in dependence on the speed of the system.

16. The system according to claim 1, wherein the 3D model is a vector based data model.

17. Method of displaying information on a display in a navigation system, which system comprises a processor and a display connected to the processor, said method comprising:
a) using said processor to access a 3D model with 3D objects,
b) using said processor to show on said display a graphical display of one or more scenes comprising a moving view on one or more of said 3D objects as seen from a certain moving point of view, said one or more 3D objects comprising at least one advertisement space, said at least one advertisement space having an advertisement space location and an advertisement space size,
c) receiving a message inclusive of message data and message location data by the navigation system,
d) in dependence on a distance between said moving point of view and said one or more 3D objects, using said processor to map said message data on said at least one advertisement space if said advertisement space location is associated with said message location data such that said message data overlays said advertisement space in said display, and
e) increasing displayed information content of said message mapped on said advertisement space, in inverse dependence on the distance between the point of view and the advertisement space location.

18. A non-transitory computer readable medium comprising instructions and data which, when loaded and executed by a system, allows a processor of said system to perform a method comprising:
a) accessing a 3D model with 3D objects
b) showing on said display a graphical display of one or more scenes comprising a moving view on one or more of said 3D objects as seen from a certain moving point of view, said one or more 3D objects comprising at least one advertisement space, said at least one advertisement space having an advertisement space location and an advertisement space size,
c) receiving a message inclusive of message data and message location data,
d) in dependence on a distance between said moving point of view and said one or more 3D objects, mapping said message data on said at least one advertisement space if said advertisement space location is associated with said message location data such that said message data overlays said advertisement space in said display, and
e) increasing displayed information content of said message mapped on said advertisement space, in inverse dependence on the distance between the point of view and the advertisement space location.

* * * * *